(12) United States Patent
Williams et al.

(10) Patent No.: US 10,450,002 B2
(45) Date of Patent: Oct. 22, 2019

(54) AUTOMATED WATERCRAFT TRANSFER

(71) Applicant: Toyota Motor Engineering & Manufacturing North America, Inc., Erlanger, KY (US)

(72) Inventors: Paxton S. Williams, Milan, MI (US); Danil V. Prokhorov, Canton, MI (US); Richard M. Sullivan, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 243 days.

(21) Appl. No.: 15/589,429

(22) Filed: May 8, 2017

(65) Prior Publication Data

US 2018/0319470 A1 Nov. 8, 2018

(51) Int. Cl.
| | |
|---|---|
| *B62D 13/06* | (2006.01) |
| *B60P 3/10* | (2006.01) |
| *B62D 15/02* | (2006.01) |
| *B60W 30/06* | (2006.01) |
| *B60W 30/18* | (2012.01) |
| *G05D 1/00* | (2006.01) |
| *B63C 13/00* | (2006.01) |
| *G05D 1/02* | (2006.01) |

(52) U.S. Cl.
CPC ............. *B62D 13/06* (2013.01); *B60P 3/10* (2013.01); *B60P 3/1033* (2013.01); *B60W 30/06* (2013.01); *B60W 30/18036* (2013.01); *B62D 15/027* (2013.01); *B63C 13/00* (2013.01); *G05D 1/0088* (2013.01); *G05D 1/0246* (2013.01); *G05D 2201/0213* (2013.01)

(58) Field of Classification Search
CPC ................. B62D 13/06; B62D 15/027; B60W 30/18036; B60W 30/06; B63C 13/00; B60P 3/10; G05D 1/0088
See application file for complete search history.

(56) References Cited

U.S. PATENT DOCUMENTS

| | | | |
|---|---|---|---|
| 9,821,808 B1* | 11/2017 | Abbas et al. .......... | B62D 13/06 |
| 2006/0048800 A1 | 3/2006 | Rast et al. | |
| 2010/0111660 A1* | 5/2010 | Mathews .............. | B60P 3/1033 |
| | | | 414/469 |
| 2018/0121833 A1* | 5/2018 | Friedman et al. ... | G05D 1/0088 |
| 2018/0215394 A1* | 8/2018 | Trageser .............. | B60P 3/1033 |

OTHER PUBLICATIONS

Retrieved from the Internet on May 2, 2017 <http://www.todaysmotorvehicles.com/article/car-design-continental-trailer-parking-040715/> dated Apr. 7, 2015.

* cited by examiner

*Primary Examiner* — Dale W Hilgendorf (74) *Attorney, Agent, or Firm* — Christopher G. Darrow; Darrow Mustafa PC (57) ABSTRACT

Various examples of transferring a watercraft between land and water are disclosed. When a vehicle receives a transfer signal, the vehicle locates a launch ramp, and the vehicle moves to the launch ramp. A trailer attached to the vehicle moved into the water using the launch ramp, such that a watercraft can be transferred between land and water via the trailer.

18 Claims, 8 Drawing Sheets

AUTOMATED WATERCRAFT TRANSFER

TECHNICAL FIELD

The present disclosure generally relates to vehicles and, more particularly, to the launching of watercraft from vehicles.

BACKGROUND

Many people own various watercraft, such as boats, jet skis, etc. To use the watercraft, the owner and/or operator of the watercraft may tow the watercraft to a launch site. The owner and/or operator may tow the watercraft using a vehicle, such as a pick-up truck, an SUV, etc. and an attached trailer. The operator may load the watercraft on the trailer attached to the vehicle and drive the vehicle to the launch site. When the operator drives the vehicle and trailer to the launch site, the operator may unload the watercraft and launch the watercraft into the water. However, launching the watercraft using the vehicle can include many difficulties, especially when the operator attempts to launch the watercraft alone.

SUMMARY

Systems and methods for launching and/or hauling out a watercraft are disclosed herein. Generally, an autonomous vehicle is autonomously controlled to move to a launch location and move a trailer into water using a launch ramp responsive to a transfer signal being received. The watercraft can be hauled from the water onto the trailer or launched into the water from the trailer when the trailer is moved into the water using the launch ramp. The disclosed systems and methods can alleviate difficulties of launching watercraft when an operator attempts to launch the watercraft alone.

One example includes a watercraft transfer system for controlling an autonomous vehicle with a trailer attached thereto, the trailer being configured to support a watercraft. The system can include a processor. The system can also include memory operatively connected to the processor. The memory can store a launch ramp detection module including instructions that, when executed by the processor, cause the processor to detect a launch location of a launch ramp relative to a current location of the autonomous vehicle responsive to receiving a transfer signal. The launch ramp can be for transferring watercraft between land and water. The memory can also store an automated control module including instructions that, when executed by the processor, cause the processor to generate one or more control signals to control the autonomous vehicle to i) move to the launch location and ii) move the trailer into the water using the launch ramp.

Another example includes a method of launching a watercraft between water and a trailer attached to an autonomous vehicle. The method can include, in response to receiving a transfer signal requesting a transfer of the watercraft between the trailer and water, detecting a launch location of a launch ramp relative to a current location of the autonomous vehicle. The method can also include generating one or more control signals to control the autonomous vehicle to i) move to the launch location and ii) to move the trailer into water using the launch ramp.

Another example includes a method of launching a watercraft in water and thereafter hauling out the watercraft from the water. The method can include generating one or more control signals to control an autonomous vehicle to i) move to a launch location and ii) to move a trailer into the water using a launch ramp. The method can also include storing the launch location in memory. The method can also include receiving a haul out signal. The method can also include generating one or more other control signals to control the autonomous vehicle to i) move to the launch location stored in memory and ii) move the trailer into the water using the launch ramp.

DETAILED DESCRIPTION

Systems and methods associated with the transferring of watercraft between land and water are disclosed herein. Typically, the transferring of watercraft to or from the water is, at least, a two person job. For example, to launch a watercraft into the water, one person will maneuver the vehicle to the launch site and down the launch ramp, and another person will remain in the watercraft to dock the watercraft. When the watercraft is launched into the water, the person maneuvering the vehicle will park the vehicle and go on the dock to enter the watercraft. Similarly, as another example, when the watercraft is being hauled out from the water, one person will dock the watercraft so that other person can retrieve the vehicle and return the vehicle and trailer to the launch site. The person in the watercraft will undock the watercraft, maneuver the watercraft to align it with the vehicle and trailer, and push the watercraft onto the trailer. These processes are tedious and an annoyance at best.

Thus, the present disclosure describes an automated system and method for transferring watercraft between land and the water. Generally, upon receiving a transfer signal, an example disclosed system locates a launch location of a launch ramp and autonomously controls an autonomous vehicle to move to the launch ramp. The disclosed system controls the autonomous vehicle to push an attached trailer down the launch ramp and into water, such that the watercraft can be transferred to or from the water. The disclosed systems and methods can expedite the launch and/or haul out process, and limit the number of people required to perform the launch and/or haul out. Further, a person can remain in their watercraft throughout the launch and/or haul out, thus easing the burdens on the person launching or hauling out the watercraft.

Figure 1:
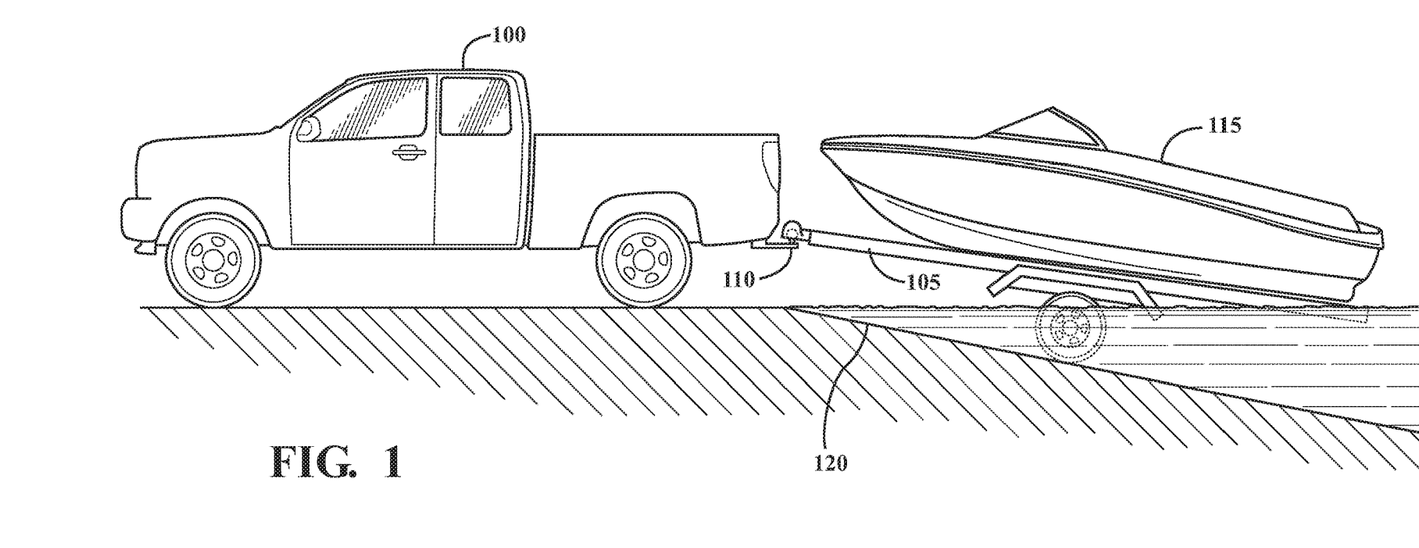
FIG. 1 is a side view of a vehicle having a trailer attached thereto.

Referring to FIG. 1, a side view of a vehicle 100 having a trailer 105 attached thereto is illustrated. As used herein, a "vehicle" is any form of motorized transport. In one or more implementations, the vehicle 100 is an automobile. While arrangements will be described herein with respect to automobiles, it will be understood that examples disclosed herein are not limited to automobiles. To the contrary, the examples disclosed herein can include any other type of vehicle that can tow a trailer 105. In one or more arrangements, the vehicle 100 can be autonomous. Autonomous, as used herein, refers to navigating and/or maneuvering the vehicle 100 along a route or path using one or more computing systems to control the vehicle 100 with minimal or no input from a human driver. The vehicle 100 will be referred to hereinafter as an autonomous vehicle 100. However, it is noted that the present disclosure is not limited to autonomous vehicles. In some examples, the autonomous vehicle 100 is configured with one or more semi-autonomous operational modes, such as a watercraft transfer mode, in which one or more computing systems perform a portion of the maneuvering of the vehicle along a route or path (e.g., when a watercraft 115 is being transferred between a trailer and water), and a vehicle operator (i.e., driver) provides inputs to the vehicle to perform a portion of maneuvering of the vehicle 100 along another route or path.

In one or more arrangements, the autonomous vehicle 100 can have a trailer hitch ball 110. In this arrangement, the trailer hitch ball 110 can be connected to the autonomous vehicle 100 via a trailer hitch receiver (not shown). The trailer hitch ball 110 can be selectively locked in the trailer hitch receiver. In some arrangements, the trailer 105 can be connected to the autonomous vehicle 100 via the trailer hitch ball 110.

Figure 3A:
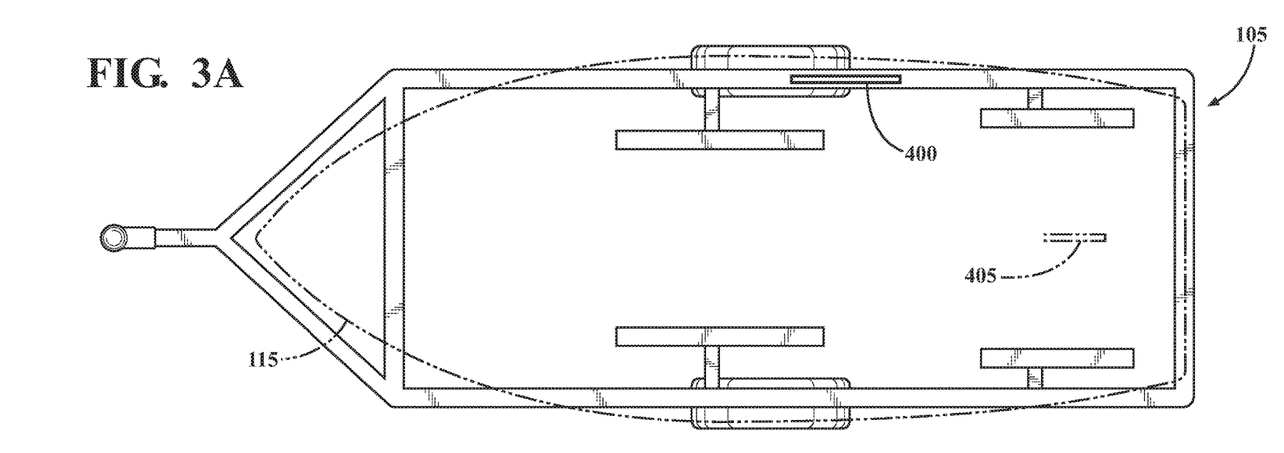
FIG. 3A-FIG. 3B illustrates two examples of the trailer of FIG. 1.
Figure 3B:
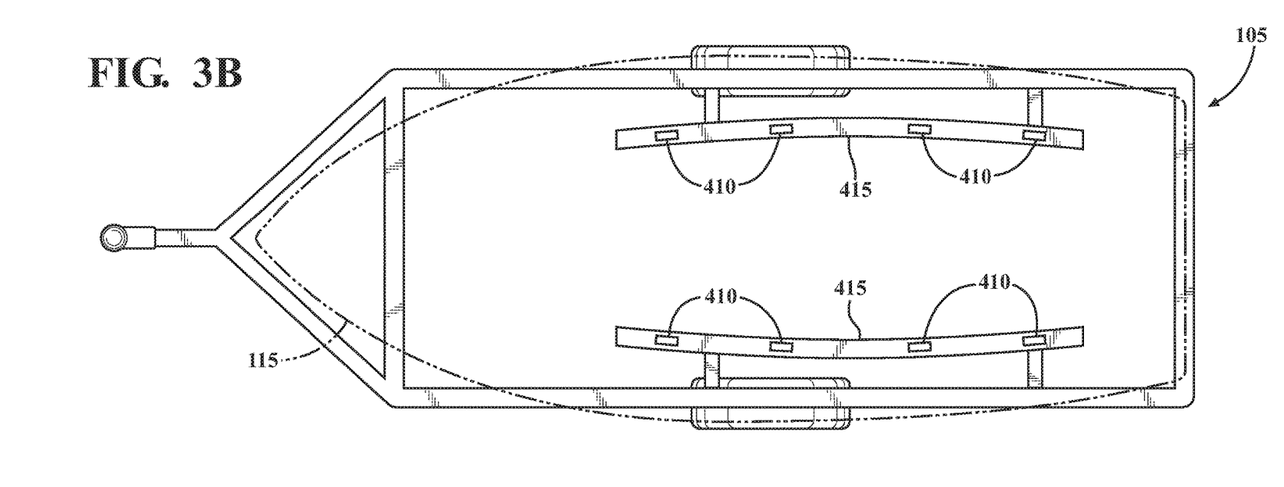

Referring briefly to FIG. 1, FIG. 3A and FIG. 3B, the trailer 105, which will be discussed in greater detail below, can be supporting or otherwise retaining a watercraft 115. The watercraft 115 can be any type of water-borne vehicle. In the examples disclosed herein, the watercraft 115 is a boat. However, the present disclosure is not limited to boats, and can include jet skis, kayaks or canoes, or any other forms of watercraft. While a bunk trailer is shown in FIG. 3A and FIG. 3B, it is noted that the present disclosure is not limited to bunk trailers. To the contrary, many other types of trailers can be used. For example, the trailer 105 can be a float-on trailer, a roller trailer, or any other type of trailer that can be used to transfer watercraft to and/or from water. In some arrangements, the trailer 105 can be used to transfer the watercraft 115 between land and the water. For example, the autonomous vehicle 100 can position the trailer 105 on a launch ramp 120 and push the trailer 105 into water to transfer the watercraft 115 between the trailer 105 and the water.

Figure 2:
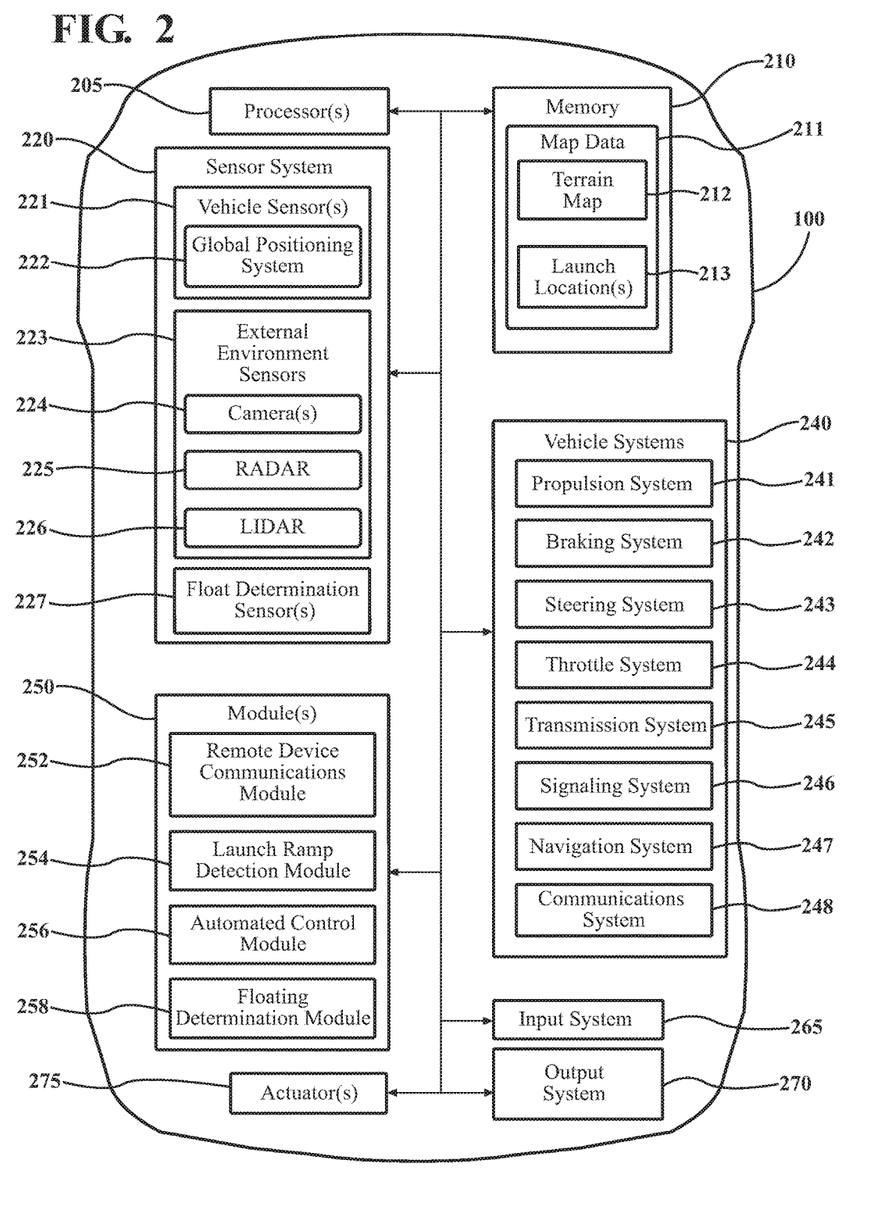
FIG. 2 is a schematic view of the vehicle of FIG. 1.

Referring now to FIG. 1 and FIG. 2, the autonomous vehicle 100 is shown in greater detail. The autonomous vehicle 100 includes various elements. It will be understood that, in various examples, it may not be necessary for the autonomous vehicle 100 to have all of the elements shown in FIG. 2. The autonomous vehicle 100 can have any combination of the various elements shown in FIG. 2. Further, the autonomous vehicle 100 can have additional elements to those shown in FIG. 2. In some arrangements, the autonomous vehicle 100 may be implemented without one or more of the elements shown in FIG. 2. Further, while the various elements are shown as being located within the autonomous vehicle 100 in FIG. 2, it will be understood that one or more of these elements can be located external to the autonomous vehicle 100. Further, the elements shown may be physically separated by large distances.

Some of the possible elements of the autonomous vehicle 100 are shown in FIG. 2 and will be described along with subsequent figures. However, a description of many of the elements in FIG. 2 will be provided after the discussion of FIG. 2-FIG. 6C for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the examples described herein. Those of skill in the art, however, will understand that the examples described herein may be practiced using various combinations of these elements.

The autonomous vehicle 100 includes one or more processor(s) 205. The processor(s) 205 are configured to implement or perform various functions described herein. In one or more arrangements, the processor(s) 205 can be a main processor of the autonomous vehicle 100. For instance, the processor(s) 205 can be an electronic control unit (ECU). The autonomous vehicle 100 can include memory 210 for storing one or more types of data. The memory 210 can be a component of the processor(s) 205, or the memory 210 can be operatively connected to the processor(s) 205 for use thereby. The term "operatively connected," as used throughout this description, can include direct or indirect connections, including connections without direct physical contact.

The autonomous vehicle 100 can include a sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In some arrangements, the sensor system 220 can include vehicle sensor(s) 221, external environment sensors 223, etc.

In one or more arrangements, the autonomous vehicle 100 can include a communications system 248. The communications system 248 can include, for example, an antenna tuned to transmit and/or receive data to one or more other devices and/or vehicles. The communications system 248 can be in communication with another vehicle and/or a remote device. For example, the remote device may be a mobile device, a device connected to the trailer 105, etc. As will be discussed in greater detail below, the autonomous vehicle 100 can use the communications system 248 to exchange data with one or more other devices and/or vehicles. The communications system 248 can communicate via, for example, dedicated short range communications devices. The communications system 248 can communicate via a cellular network, BLUETOOTH, Wi-Fi, etc. The communications system 248 can also communicate with the one or more other devices via wired communications.

In one or more arrangements, the memory 210 can include various instructions stored thereon. In one or more arrangements, the memory 210 can store one or more modules 250. Modules can be or include computer-readable instructions that, when executed by the processor(s) 205, cause the processor(s) 205 to perform the various functions disclosed herein. While one or more modules 250 can be stored on memory 210, it should be noted the various modules can be stored on and/or be a component of the processor(s) 205, can be remotely stored and accessible by the processor(s), etc.

In one or more arrangements, the autonomous vehicle 100 can include one or more remote device communication module(s) 252. The remote device communication module(s) 252 can include instructions to generate one or more signals for or interpret one or more signals from the communications system 248. For example, the communications system 248 can receive a signal from a remote device 600 (of FIG. 6). In this example, the remote device 600 may be configured to transmit a plurality of different signals, such as a launch signal, a confirmation signal, a haul out signal, etc. The remote device 600 may be a mobile device, such as a cell phone, a laptop, etc., a device connected to vehicle 100 via the trailer connector, etc. The signal can be transmitted from the remote device 600 to the communications system 248. The remote device communication module(s) 252 can interpret the signal from the remote device 600. In this regard, the remote device communication module(s) 252 can determine whether the remote device 600 transmitted a launch signal, a confirmation signal, a haul out signal, etc. As will be discussed in greater detail below, each of these signals can be used by the autonomous vehicle 100 to perform different functions, such as launching a watercraft 115 into water, confirming one or more steps or functions performed by the autonomous vehicle 100, and/or hauling a watercraft 115 from the water.

In some arrangements, the remote device communication module(s) 252 can generate one or more signals to transmit via the communications system 248. For example, the remote device communication module(s) 252 can generate one or more request signals, one or more stop signals, and/or one or more successful launch signals. As will be discussed in greater detail below, these signals can be received by the remote device 600. The request signals can correspond to a request for confirmation from the user. The stop signal can correspond to an indication that the autonomous vehicle 100 has been stopped from further proceeding down the launch ramp 120. The successful launch signal can indicate that the watercraft 115 has been successfully transferred from the trailer 105 to the water.

In some arrangements, the remote device communication module(s) 252 can generate one or more signals for surrounding vehicles. For example, the remote device communication module(s) 252 can generate a signal to indicate that the autonomous vehicle 100 has received a haul out signal (or launch signal) from the remote device 600. The signals generated by the remote device communication module(s) 252 can be used to generate or determine a queue of vehicles waiting to proceed to the launch ramp 115. As will be discussed in greater detail below, the automated control module can use the queue of vehicles to determine when the autonomous vehicle 100 is first in line to proceed to the launch ramp 115.

The autonomous vehicle 100 can include one or more launch ramp detection module(s) 254. The launch ramp detection module(s) 254 can include instructions to detect a launch location of a launch ramp (aka a slipway). The launch location may be a location where a watercraft 115 can be transferred between land and water. Launch ramp, as used herein, includes any ramp that partially extends into a body of water and is usable for transferring watercraft between land and water. In one or more arrangements, the launch location may be located at the launch ramp. In one or more arrangements, the launch ramp detection module(s) 254 can be configured to detect the launch location responsive to the remote device communication module(s) 252 receiving a signal (e.g., a launch signal and/or a haul out signal) via the communications system 248.

The launch ramp detection module(s) 254 can detect the launch location using one or more sensors of the sensor system 220. In some arrangements, the launch ramp detection module(s) 254 can detect one or more markers positioned at or near the launch ramp. The markers may be signs, barricades, poles, or any other type of symbol or object used or usable to indicate a location of something. In other arrangements, the launch ramp detection module(s) 254 can detect a downward pitch in the terrain that extends between land and water using, for example, LIDAR sensor(s) 226 or other sensors capable of or configured to map a terrain. The launch ramp detection module(s) 254 can detect the launch location based on the mapped terrain.

In one or more arrangements, the launch ramp detection module(s) 254 confirms the launch location. In one example, the memory 210 can include map data 211 stored thereon. The map data 211 can include a plurality of launch location(s) 213, including the launch location detected by the launch ramp detection module(s) 254. The launch ramp detection module(s) 254 can compare the detected launch location to, for example, the nearest of the plurality of launch location(s) 213 stored on memory 210. If the locations sufficiently match (e.g., the locations are the same or within an acceptable variance of one another), the detected launch location can be confirmed. In another example, the launch ramp detection module(s) 254 can confirm the launch location by sending a signal to the remote device 600 (of FIG. 6A-6C) via the remote device communication module(s) 252 and communications system 248. The signal may be an image, for example, of the launch location. A user of the remote device 600 can confirm or disaffirm the launch location (e.g., by selecting a button on the remote device 600). In both examples, the launch ramp detection module(s) 254 can confirm the launch location; either by iterative analysis, or by a user manually confirming the location. In some arrangements, the autonomous vehicle 100 may determine whether or not to perform one or more actions based on whether the launch location has been confirmed. For example, and as will be discussed in greater detail below, the autonomous vehicle 100 may be controlled to move responsive to the launch location being confirmed.

The autonomous vehicle 100 can include one or more automated control module(s) 256. As will be discussed in greater detail below, the automated control module(s) 256 can include instructions to generate one or more control signals to move the autonomous vehicle 100. In some examples, the automated control module(s) 256 can move the autonomous vehicle 100 towards the launch ramp 120.

When the autonomous vehicle 100 has a trailer 105 attached thereto, the automated control module(s) 256 can maneuver the autonomous vehicle 100 towards the launch ramp 120 and thereby push the trailer 105 down the launch ramp 120 into water. In some examples, the automated control module(s) 256 may generate the one or more control signals responsive to the launch location being confirmed (e.g., by the launch ramp detection module(s) 254). In some examples, the automated control module(s) 256 may generate the one or more control signals responsive to the autonomous vehicle 100 being first in line to use the launch ramp 115 (based on the location of the autonomous vehicle 100 in the queue of vehicles to use the launch ramp). In some examples, the automated control module(s) 256 may generate the one or more control signals responsive to the autonomous vehicle 100 receiving confirmation signals from the remote device 600 via the remote device communication module(s) 252 and communications system 248.

In one or more arrangements, the automated control module(s) 256 can include instructions to receive and/or retrieve one or more measurements for the trailer 105. For example, a user can input one or more measurements for the trailer 105. In some arrangements, the autonomous vehicle 100 can provide one or more measurements for the user to take on the trailer 105 (e.g., via a head unit, by transmitting one or more signals to the remote device 600, etc.). The user can then take the one or more measurements of the trailer 105 and provide the one or more measurements to the autonomous vehicle 100. In another example, a user can input the make/model/serial number/etc. of the trailer 105 into the vehicle head unit (not shown). In this example, the memory 210 can store a database of dimensions for a plurality of trailers including the trailer 105. Additionally or alternatively, the autonomous vehicle 100 can access a database stored remotely (e.g., cloud storage) that includes dimensions for the trailer 105. In both arrangements, the dimensions for the plurality of trailers can be associated with a make/model/serial number/etc. The autonomous vehicle 100 can determine the dimensions for the trailer 105 based on the make/model/serial number/etc. that the user input into the vehicle head unit. The dimensions and/or measurements of the trailer 105 can be used for predicting movements of the trailer 105 resulting from the autonomous vehicle 100 being controlled to move. For example, the automated control module(s) 256 can generate one or more control signals to move the autonomous vehicle 100 based on the predicted movements of the trailer 105. As such, the automated control module(s) 256 can generate one or more control signals to move the autonomous vehicle 100 and thereby move the trailer 105.

In some arrangements, the automated control module(s) 256 can detect one or more conditions about the trailer 105 and/or the autonomous vehicle 100. For example, the automated control module(s) 256 can use data from one or more sensor(s) of the sensor system 220 to detect one or more conditions about the trailer 105 and/or autonomous vehicle 100. In this example, sensor(s) may be positioned on the autonomous vehicle 100 and/or the trailer 105. The one or more conditions can include, for example, trailer jackknifing. The one or more conditions can also include whether the autonomous vehicle 100 is in water. In arrangements where the automated control module(s) 256 detects the one or more conditions, the automated control module(s) 256 can generate one or more other signals to maneuver the autonomous vehicle 100 and alleviate or mitigate the one or more conditions. For example, the automated control module(s) 256 can determine whether the trailer 105 is jackknifing using one or more rearward looking camera(s) 224, and the automated control module(s) 256 can turn the autonomous vehicle 100 in the opposite direction of the jackknifing. As another example, the automated control module(s) 256 can determine whether the autonomous vehicle 100 is in water using one or more back-up camera(s) 224, and the automated control module(s) 256 can stop the autonomous vehicle 100 from further moving the trailer 105 into the water along the launch ramp 120. Additionally, the remote device communication module(s) 252 can transmit a stop signal to the remote device 600 indicating that the watercraft 115 cannot be transferred between the water and the trailer 105 using the launch ramp 120.

In some arrangements, the automated control module(s) 256 can further include instructions to generate the one or more control signals when the launch location of the launch ramp 120 is confirmed. In some arrangements, the remote device communication module(s) 252 can generate one or more request signals for confirmation to be sent to the remote device 600 (of FIG. 6) via the communications system 248. In this arrangement, the automated control module(s) 256 can generate one or more of the one or more control signals responsive to receiving confirmation signals from the remote device 600. For example, the remote device communication module(s) 252 can generate a request signal prior to the autonomous vehicle 100 pushing the trailer 105 down the launch ramp 120, prior to the autonomous vehicle 100 pushing the trailer 105 into the water, etc. The remote device communication module(s) 252 can send the request signal to the remote device 600 via the communications system 248. The user can confirm or disaffirm, via the remote device 600, the trailer 105 being pushed down the launch ramp 120, the trailer 105 being pushed into water, etc. The remote device 600 can transmit a confirmation or disaffirmation signal, which can be received by the communications system 248 and interpreted by the remote device communication module(s) 252. Responsive to the remote device communication module(s) 252 determining that the remote device 600 transmitted a confirmation signal, the automated control module(s) 256 can generate one or more of the one or more control signals. For example, the automated control module(s) 256 can push the trailer 105 down the launch ramp 120, push the trailer 105 into the water, etc. responsive to the remote device communication module(s) 252 determining the remote device 600 transmitted a confirmation signal for the autonomous vehicle 100 to do so.

The autonomous vehicle 100 can include one or more floating determination module(s) 258. The floating determination module(s) 258 can include instructions to determine whether the watercraft 115 on the trailer 105 is floating. In one or more arrangements, the floating determination module(s) 258 can determine whether the watercraft 115 on the trailer 105 is floating as the automated control module(s) 256 continues to generate the one or more control signals to move the trailer 105 into the water.

Referring now to FIG. 2, FIG. 3A and FIG. 3B, two examples of the trailer 105 are shown. One or more float determination sensor(s) 227 can be positioned on the autonomous vehicle 100, the trailer 105, and/or the watercraft 115.

As shown in FIG. 3A, the float determination sensor(s) 227 can be a first and second pitch sensor 400, 405. For example, the trailer 105 can include the first pitch sensor 400. Additionally, the watercraft 115 (shown in phantom) can include the second pitch sensor 405. Both the first and second pitch sensor 400, 405 can be operatively connected to the processor(s) 205. In some examples, one or more of the pitch sensors 400, 405 can wirelessly transmit data to the processor(s) 205. In another example, one or more of the pitch sensors 400, 405 can be connected to the processor(s) 205 through the trailer connector (not shown). The pitch sensor(s) 400, 405 can transmit the pitch of body that they are positioned on (e.g., the watercraft 115 and the trailer 105).

As shown in FIG. 3B, the float determination sensor(s) 227 can be a contact sensor. For example, the trailer 105 can include contact sensor(s) 410. The contact sensor(s) 410 can be positioned on the support surface(s) 415. The contact sensor(s) 410 can detect, for example, force applied to the support surface(s) 415. One or more contact sensor(s) 410 can be positioned in an area of the trailer 105 located proximate to the stern of the watercraft 115.

In other arrangements, the float determination sensor(s) 227 can be camera(s) 224. For example, the autonomous vehicle 100 can include camera(s) 224 positioned to capture images of the watercraft 115. The camera(s) 224 can transmit the images to the processor(s) 205, which can process the images from the camera(s) 224 using image processing software. The processor(s) 205 can determine whether the watercraft 115 in the image appears to be floating based on changes in relative position of the watercraft 115 and the autonomous vehicle 100 and/or the trailer 105.

Referring back to FIG. 2, the floating determination module(s) 258 can determine whether the watercraft 115 on the trailer 105 is floating based on data from any of the previously identified float determination sensor(s) 227 in the sensor system 220. Where the pitch sensor(s) are used, the floating determination module(s) 258 can determine whether the watercraft 115 on the trailer 105 is floating based on the detected pitch of the watercraft 115 relative to the detected pitch of the trailer 105. For example, the floating determination module(s) 258 can determine that the watercraft 115 is floating responsive to the pitch of the trailer 105 being greater than the pitch of the watercraft 115. In some examples, where the pitch of the watercraft 115 is substantially flat and the trailer is in water, the floating determination module(s) 258 can determine that the watercraft 115 is floating. Additionally or alternatively, where contact sensor(s) are used, the floating determination module(s) 258 can determine whether the watercraft 115 on the trailer is floating based on whether or not the watercraft 115 is in contact with the trailer 105.

In some arrangements, responsive to the floating determination module(s) 258 determining that the watercraft is floating, the automated control module(s) 256 can determine the current location and/or position of the autonomous vehicle 100. In some examples, the automated control module(s) 256 can determine the current location based on data from the global positioning system(s) 222. The automated control module(s) 256 can store the current location as a launch location 213 in memory 210.

In some arrangements, responsive to the floating determination module(s) 258 determining that the watercraft is floating, the automated control module(s) 256 can generate one or more control signals to locate a parking spot and move the autonomous vehicle 100 and trailer from the current location stored in memory 210 to the parking spot. The autonomous vehicle 100 can wait in the parking spot until the remote device communication module(s) 252 detect a transfer signal (e.g., a haul out signal). When the remote device communication module(s) 252 detect the transfer signal, the automated control module(s) 256 can generate control signal(s) to return to the location stored in memory 210 so that a user can maneuver the watercraft 115 onto the trailer 105 from the water.

Now that various aspects of the autonomous vehicle 100 have been described, methods of transferring a watercraft between water and a trailer attached to an autonomous vehicle will be described with reference to FIG. 4 and FIG. 5A-5B. The flowcharts shown herein are only for exemplary purposes. The following disclosure should not be limited to each and every function block shown in the flowcharts. To the contrary, the methods do not require each and every function block shown. In some examples, the methods can include additional function blocks. Further, the methods do not need to be performed in the same chronological order shown in these flowcharts. To the extent possible, reference will be made to the structure described above. As such, particular function blocks of the flowcharts will be discussed with reference to various components of the system described above. However, it should be appreciated that the methods depicted by the exemplary flowcharts can be implemented by other components of the described system.

Figure 4:
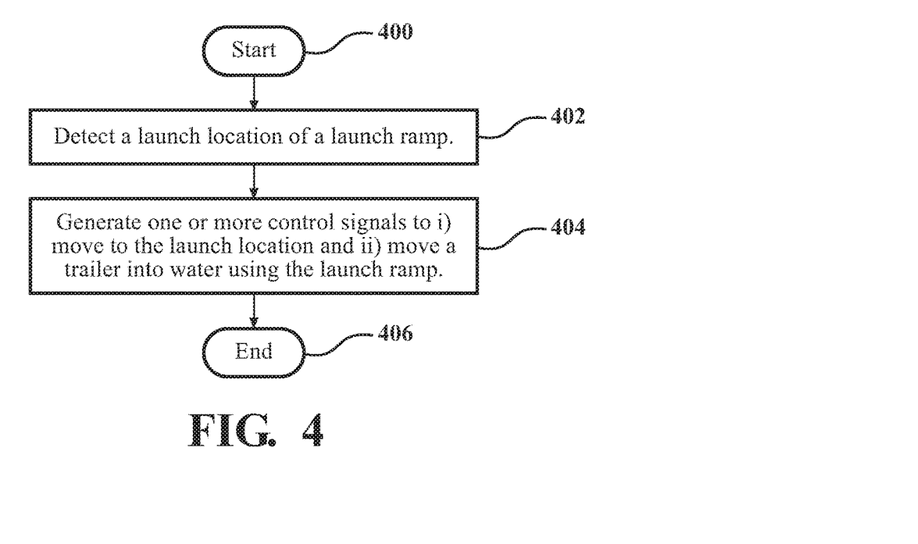
FIG. 4 illustrates an example method of transferring a watercraft between water and a trailer attached to an autonomous vehicle.

Referring specifically to FIG. 4, a method of transferring water between a trailer 105 attached to an autonomous vehicle 100 and water is shown. The method can begin at starting block 400. In some arrangements, the method can begin in response to receiving a transfer signal from the remote device 600 (of FIG. 6A-FIG. 6C). The transfer signal from the remote device 600 may be a haul out signal, a launch signal, etc. Therefore, the remote device 600 may send a launch signal and/or a haul out signal, which starts the method disclosed herein. From starting block 400, the processor(s) 205 can execute instructions from the launch ramp detection module(s) 254 according to function block 402.

At function block 402, the launch ramp detection module(s) 254 can detect a launch location of a launch ramp 120. The launch ramp detection module(s) 254 can detect the launch location of the launch ramp 120 using one or more sensor(s) of the sensor system 220. In some arrangements, the launch ramp detection module(s) 254 can detect one or more markers positioned at or near the launch ramp. In other arrangements, the launch ramp detection module(s) 254 can detect a downward pitch in the terrain that extends between land and water using, for example, LIDAR sensor(s) 226 or other sensors capable of or configured to map terrain. Additionally or alternatively, the launch location may be stored in the memory 210 of the autonomous vehicle 100. The autonomous vehicle 100 may have previously launched a watercraft 115 via the launch ramp 120. In this example, the autonomous vehicle 100 can store the launch location of the launch ramp 120 used to launch the watercraft 115. The autonomous vehicle 100 can detect the launch location of the launch ramp 120 by accessing the memory 210. The processor(s) 205 can execute instructions from the automated control module(s) 256 according to function block 404.

At function block 404, the automated control module(s) 256 can generate one or more control signals to move to the launch location detected at function block 402. The automated control module(s) 256 can move the autonomous vehicle 100 towards the launch location and position the trailer 105 into the water using the launch ramp 120. From this position, a watercraft 115 can be transferred between the trailer 105 and the water. The processor(s) 205 can continue to end block 406.

At end block 406, the method can end. The method can end when the watercraft 115 is transferred (or ready to be transferred) between water and the trailer 105. Additionally or alternatively, the method can end when the automated control module(s) 256 detects one or more conditions about the trailer 105 (e.g., trailer jackknifing) and/or the autonomous vehicle 100 (e.g., the autonomous vehicle being in water).

Figure 5A:
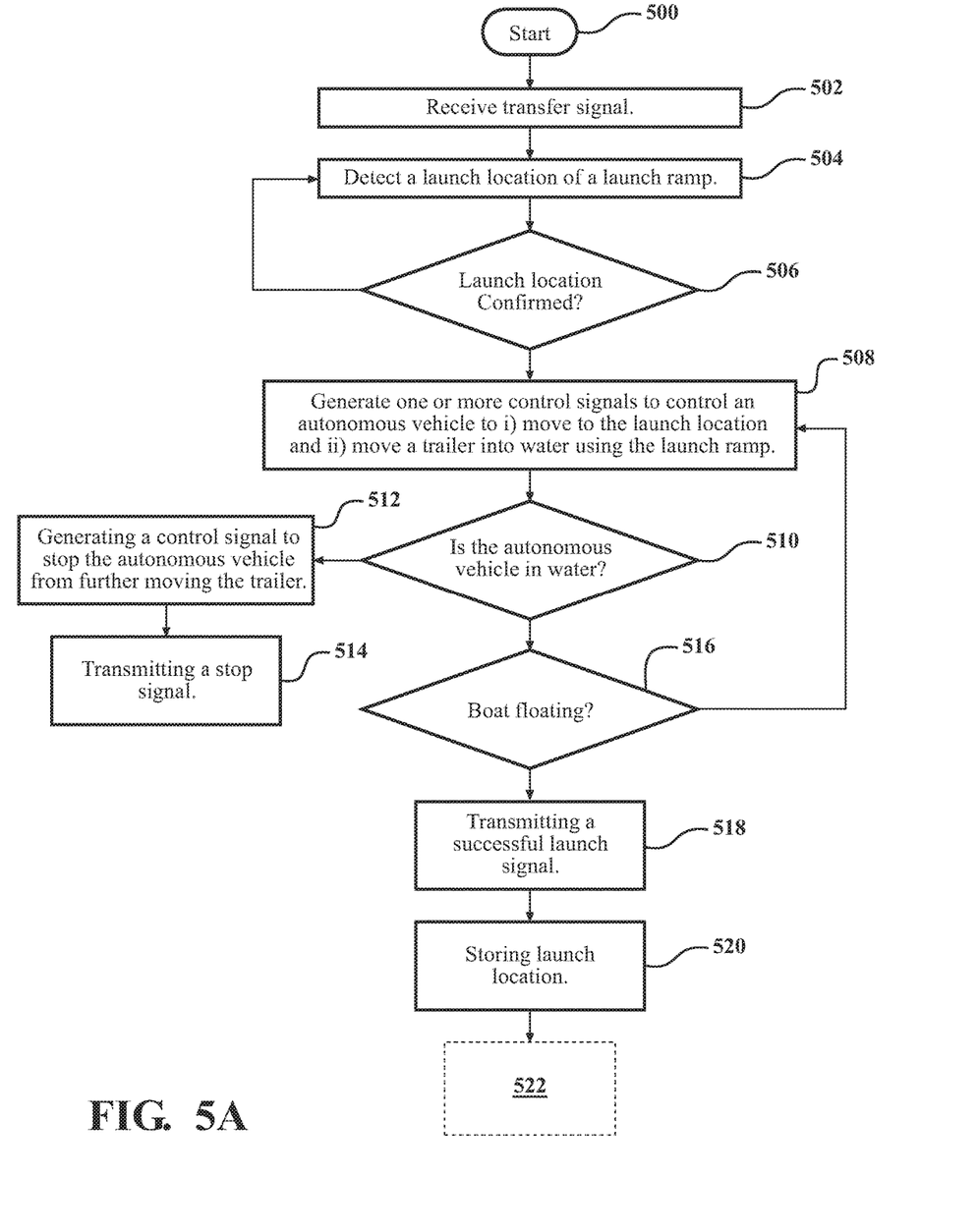
FIG. 5A-FIG. 5B illustrate another example method of transferring a watercraft between water and a trailer attached to an autonomous vehicle.

Referring now to FIG. 5A, a method of transferring water between a trailer 105 attached to an autonomous vehicle 100 and water. The method can begin at starting block 500. In some arrangements, the method can begin when the autonomous vehicle 100 is turned on. In some arrangements, the method can begin when the autonomous vehicle 100 is located at a launch site. From starting block 500, the processor(s) 205 can execute instructions from the remote device communications module(s) 252 according to function block 502.

At function block 502, the remote device communication module(s) 252 can receive a transfer signal. The remote device communication module(s) 252 can receive the transfer signal from the remote device 600 via the communications system 248. The transfer signal may be a launch signal, a haul out signal, etc. The launch signal may be a signal sent from the remote device 600 indicating that the user would like to launch a watercraft 115 into water. The haul out signal may be a signal sent from the remote device 600 indicating that the user would like to haul a watercraft 115 from the water. From function block 502, the processor(s) 205 can execute instructions from the launch ramp detection module(s) 254 according to function block 504.

At function block 504, the launch ramp detection module(s) 254 can detect a launch location of a launch ramp 120. Function block 504 can be similar to function block 402. From function block 504, the processor(s) 205 can execute instructions from the launch ramp detection module(s) 254 according to decision block 506.

At decision block 506, the launch ramp detection module(s) 254 can determine whether the launch location is confirmed. In some arrangements, the launch ramp detection module(s) 254 can compare the launch location detected at function block 504 to one or more launch location(s) 213 stored on memory 210. For example, the launch ramp detection module(s) 254 can determine the launch location(s) 213 closest to the current location of the autonomous vehicle 100. The launch ramp detection module(s) 254 can determine whether the launch location detected at function block 504 is substantially the same as, for example, the closest launch location 213 stored on memory 210. Responsive to the launch location being confirmed, the processor(s) 205 can execute instructions from the automated control module(s) 254 according to function block 508. However, responsive to the launch location not being confirmed, the processor(s) 205 can execute instructions from the launch ramp detection module(s) 254 according to function block 504.

Figure 6A:
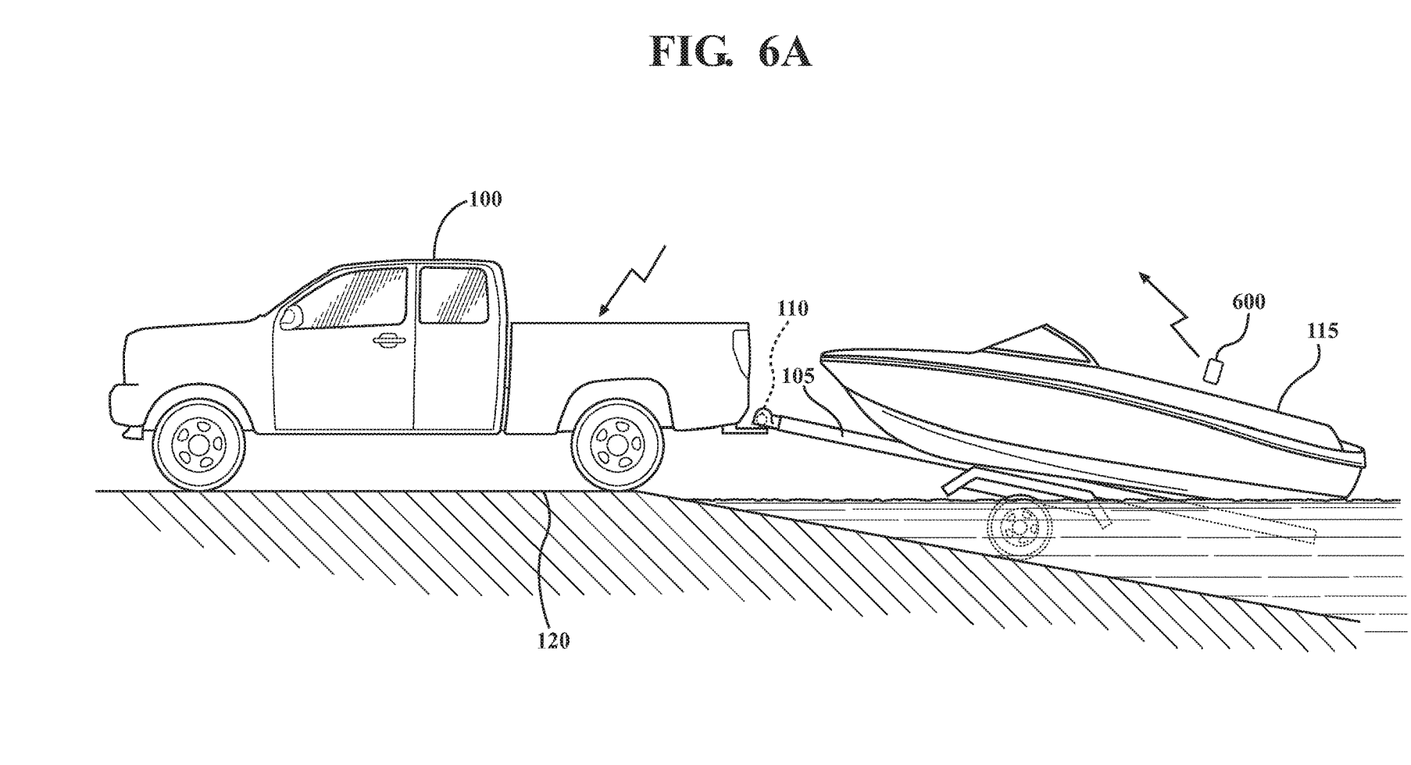
FIG. 6A-FIG. 6C illustrates different examples of environments including the vehicle and trailer of FIG. 1.

Referring to FIG. 5A and FIG. 6A, at function block 508, the automated control module(s) 256 can generate one or more control signals to control the autonomous vehicle 100. The automated control module(s) 256 can move the autonomous vehicle 100 to the launch location. The automated control module(s) 256 can move the autonomous vehicle 100 to position the trailer 105 into water using the launch ramp 120. As shown in FIG. 6A, the watercraft 115 is being transferred into water. The automated control module(s) 256 can align the autonomous vehicle 100 and the trailer 105 with the launch ramp 120. The automated control module(s) 256 can move the autonomous vehicle 100 to push the trailer 105 into the water via the launch ramp 120. From function block 508, the processor(s) 205 can execute instructions from the automated control module(s) 256 according to decision block 510.

Figure 6B:
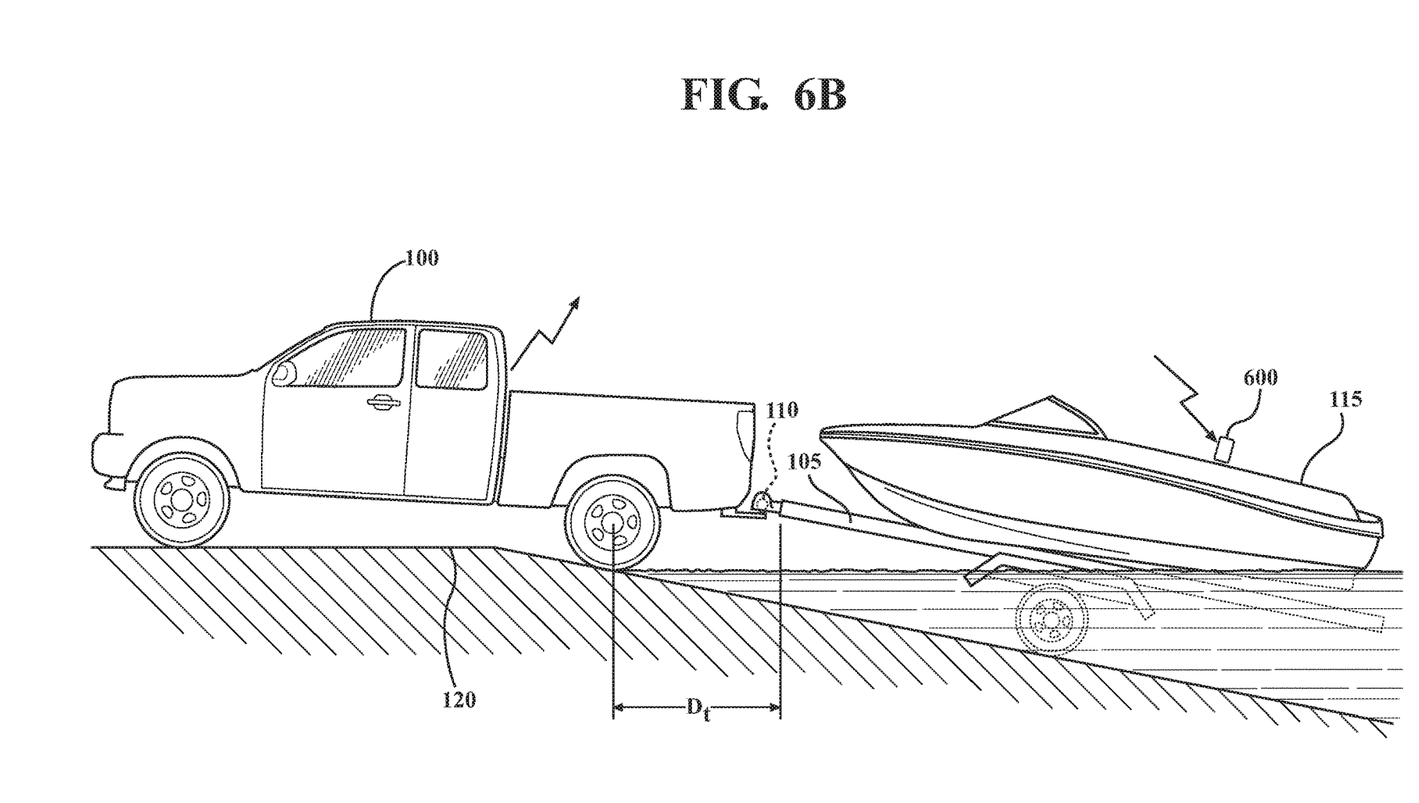

Referring to FIG. 5A and FIG. 6B, at decision block 510, the automated control module(s) 256 can determine whether the autonomous vehicle 100 is in water. The automated control module(s) 256 can determine whether the autonomous vehicle 100 is in water based on data from, for example, a back-up camera 224. The back-up camera 224 may be a wide angle camera. The automated control module(s) 256 can determine whether the autonomous vehicle 100 is in water based on images captured by the camera 224. As the autonomous vehicle 100 moves down the launch ramp 120, the back-up camera 224 will detect a reflection of the water. When the water is detected by the back-up camera 224 and the autonomous vehicle 100 continues to move down the launch ramp 120, the autonomous vehicle 100, in one example, monitors the distance the autonomous vehicle 100 moves down the launch ramp 120. Responsive to determining the distance exceeds a threshold distance Dt, the automated control module(s) 256 can determine that the autonomous vehicle 100 is in the water. In one or more arrangements, the threshold distance Dt may be a distance between a portion of the field of view of the back-up camera 224 (in some arrangements, the rear bumper) and the rear wheel. If the autonomous vehicle 100 is in the water, the processor(s) 205 can execute instructions from the automated control module(s) 256 according to function block 512. However, if the autonomous vehicle 100 is not in water, the processor(s) 205 can execute instructions from the automated control module(s) 256 according to decision block 516.

At function block 512, the automated control module(s) 256 can generate a control signal to stop the autonomous vehicle 100 from further moving the trailer 105. The automated control module(s) 256 can generate the control signal to stop the autonomous vehicle 100 from moving the trailer 105 down the launch ramp 120 if the autonomous vehicle 100 is in the water. From function block 512, the processor(s) 205 can execute instructions from the remote device communication module(s) 252 according to function block 514. At function block 514, the remote device communication module(s) 252 can generate a stop signal to transmit to the remote device 600 via the communications system 248. The stop signal can indicate to the user of the remote device 600 that the launch and/or haul out was unsuccessful at the particular launch location detected at function block 504.

At decision block 516, the floating determination module(s) 258 can determine whether the watercraft 115 is floating. The floating determination module(s) 258 can determine whether the watercraft 115 on the trailer 105 is floating based on data from the float determination sensor(s) 227 in the sensor system 220. Where the pitch sensor(s) 400, 405 are used, the floating determination module(s) 258 can determine whether the watercraft 115 on the trailer 105 is floating based on the detected pitch of the watercraft 115 relative to the detected pitch of the trailer 105. Where contact sensor(s) 410 are used, the floating determination module(s) 258 can determine whether the watercraft 115 on the trailer is floating based on whether or not the watercraft 115 is in contact with the trailer 105. If the watercraft 115 is not floating, the processor(s) 205 can execute instructions from the automated control module(s) 256 according to function block 508. However, where the watercraft 115 is floating, processor(s) 205 can execute instructions from the remote device communication module(s) 252 according to function block 518.

At function block 518, the remote device communication module(s) 252 can generate a successful launch signal to transmit to the remote device 600. The successful launch signal can indicate to a user of the remote device 600 that the watercraft 115 has been successfully launched, and that it is safe to operate the watercraft 115. From function block 518, the processor(s) 205 can execute instructions from the automated control module(s) 256 according to function block 520.

At function block 520, the automated control module(s) 256 can store the location (and position) of the autonomous vehicle 100. The automated control module(s) 256 can store the location (and position) of the autonomous vehicle 100 in memory 210, for example. In some arrangements, the automated control module(s) 256 can generate one or more signals to move the autonomous vehicle 100 up the launch ramp 115 with the trailer 105. The automated control module(s) 256 can also generate one or more signals to autonomously park the autonomous vehicle 100 and trailer 105. From function block 520, the processor(s) 205 can execute instructions from the remote device communication module(s) 252 according to function block 522 of FIG. 5B.

Figure 5B:
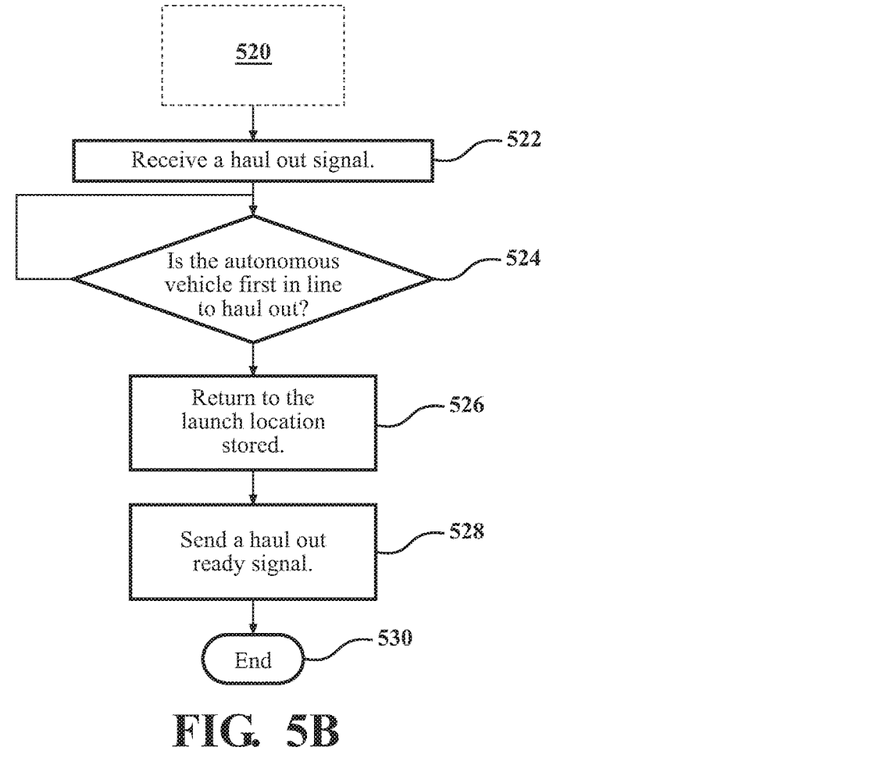
Figure 6C:
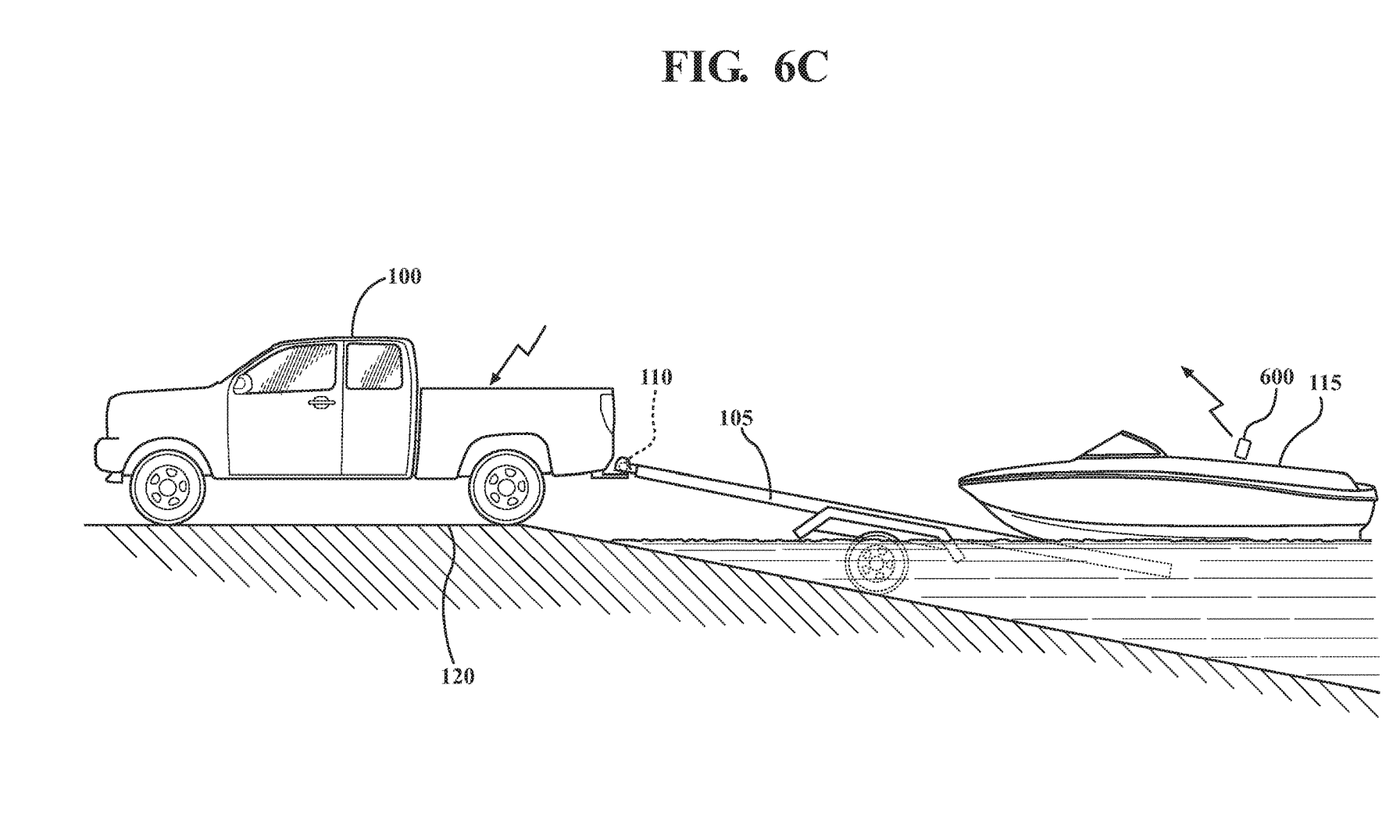

Referring now to FIG. 5B and FIG. 6C, at function block 522, the remote device communication module(s) 252 can receive another signal from the remote device 600. The remote device 600 can transmit a haul out signal from the watercraft 115, for example. The remote device 600 can transmit the haul out signal to the autonomous vehicle 100 via the communications system 248. The remote device communication module(s) 252 can receive the haul out signal via the communications system 248. In some arrangements, the watercraft 115 may be a distance away from the launch ramp 120. For example, a user may be operating the watercraft 115 and, when the user is finished operating the watercraft 115, the user may provide a selection on the remote device 600, and the remote device 600 may send the haul out signal to the autonomous vehicle 100. The remote device 600 may send the haul out signal to the autonomous vehicle 100 when the user wants to load the watercraft 115 onto the trailer 105. The processor(s) 205 can execute instructions from the remote device communication module(s) 252 according to decision block 524.

At decision block 524, the remote device communication module(s) 252 determines whether the autonomous vehicle 100 is first in line to haul out the watercraft 115. In this arrangement, the communications system 248 can receive a status of the launch ramp 120. For example, when an autonomous vehicle 100 receives a haul out signal, the autonomous vehicle 100 can transmit a status to each of the surrounding vehicles. As a result, each of the vehicles at a launch site will indicate when a haul out signal is received. The communications system 248 can determine how many autonomous vehicles have received haul out signals from respective remote devices, and when each autonomous vehicle received a haul out signal. The remote device communication module(s) 252 can determine when no other surrounding vehicles have received haul out signals prior to the autonomous vehicle 100 receiving the haul out signal. If the autonomous vehicle 100 is first in line to haul out the watercraft 115, the processor(s) 205 can execute instructions from the automated control module(s) 256 according to function block 526. However, where the autonomous vehicle 100 is not first in line to haul out the watercraft 115, the processor(s) 205 can continue to execute instructions from the remote device communication module(s) 252 according to decision block 524 until the autonomous vehicle 100 is first in line to haul out the watercraft 115.

At function block 526, the automated control module(s) 256 can return to the location stored in memory (at function block 520). The automated control module(s) 256 can generate one or more control signals to return the autonomous vehicle 100 (and trailer 105) back to the location (and position) where the watercraft 115 was launched from the trailer 105 into the water. When the autonomous vehicle 100 is moved to the launch location of the launch ramp 120 and the trailer 105 is positioned into water using the launch ramp 120, the processor(s) 205 can execute instructions from the remote device communication module(s) 252 according to function block 528.

At function block 528, the remote device communication module(s) 252 can transmit a haul out ready signal to the remote device 600 via the communications system 248. The remote device 600 can receive the haul out ready signal from the communications system 248 of the autonomous vehicle 100. The remote device 600 can indicate that the autonomous vehicle 100 is properly positioned on the launch ramp 120, and that the watercraft 115 can be hauled out of the water and onto the trailer 105. A user of the remote device 600 can observe an indication on the remote device 600 and can control the watercraft 115 to move the watercraft 115 onto the trailer 105. The processor(s) 205 can continue to end block 530.

At end block 530, the method can end. The method can end when the vehicle 100 and the trailer 105 are positioned for the watercraft 115 to loaded onto the trailer 105.

FIG. 2 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more examples, the autonomous vehicle 100 is an autonomous vehicle. As used herein, "autonomous vehicle" refers to a vehicle that operates in an autonomous mode. "Autonomous mode" refers to navigating and/or maneuvering the autonomous vehicle 100 along a travel route using one or more computing systems to control the autonomous vehicle 100 with minimal or no input from a human driver. In one or more examples, the autonomous vehicle 100 is highly automated or completely automated. In one example, the autonomous vehicle 100 is configured with one or more semi-autonomous operational modes (e.g., a watercraft transfer mode) in which one or more computing systems perform a portion of the navigation and/or maneuvering of the vehicle along a travel route, and a vehicle operator (i.e., driver) provides inputs to the vehicle to perform a portion of the navigation and/or maneuvering of the autonomous vehicle 100 along a path.

The autonomous vehicle 100 can include memory 210 for storing one or more types of data. The memory 210 store can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 210 can be a component of the processor(s) 205, or the memory 210 can be operatively connected to the processor(s) 205 for use thereby. The term "operatively connected," as used throughout this description, can include direct or indirect connections, including connections without direct physical contact.

In one or more arrangements, the memory 210 can include map data 211. The map data 211 can include maps of one or more geographic areas. In some instances, the map data 211 can include information or data on roads, traffic control devices, road markings, structures, features, and/or landmarks in the one or more geographic areas. The map data 211 can be in any suitable form. In some instances, the map data 211 can include aerial views of an area. In some instances, the map data 211 can include ground views of an area, including 360-degree ground views. The map data 211 can include measurements, dimensions, distances, and/or information for one or more items included in the map data 211 and/or relative to other items included in the map data 211. The map data 211 can include a digital map with information about road geometry. The map data 211 can be high quality and/or highly detailed.

In one or more arrangements, the map data 211 can include one or more terrain maps 212. The terrain map(s) 212 can include information about the ground, terrain, roads, surfaces, and/or other features of one or more geographic areas. The terrain map(s) 212 can include elevation data in the one or more geographic areas. The map data 211 can be high quality and/or highly detailed. The terrain map(s) 212 can define one or more ground surfaces, which can include paved roads, unpaved roads, land, and other things that define a ground surface.

In one or more arrangements, map data 211 can include a plurality of launch location(s) 213. The launch location(s) 213 stored on map data 211 may be a location where a watercraft 115 can be transferred between land and water. The launch location(s) 213 can correspond to a location of a launch ramp. The launch ramps include any ramp that partially extends into a body of water and is usable for transferring watercraft between land and water.

In some instances, at least a portion of the map data 211 can be located in memory 210 located onboard the autonomous vehicle 100. Alternatively, or in addition, at least a portion of the map data 211 can be located in memory 210 that is located remotely from the autonomous vehicle 100.

As noted above, the autonomous vehicle 100 can include the sensor system 220. The sensor system 220 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor(s) 205, the memory 210, and/or another element of the autonomous vehicle 100 (including any of the elements shown in FIG. 2). The sensor system 220 can acquire data of at least a portion of the external environment of the autonomous vehicle 100 (e.g., the present context).

The sensor system 220 can include any suitable type of sensor. Various examples of different types of sensors will be described herein. However, it will be understood that the examples are not limited to the particular sensors described. The sensor system 220 can include one or more vehicle sensor(s) 221. The vehicle sensor(s) 221 can detect, determine, and/or sense information about the autonomous vehicle 100 itself. In one or more arrangements, the vehicle sensor(s) 221 can be configured to detect, and/or sense position and orientation changes of the autonomous vehicle 100, such as, for example, based on inertial acceleration. In one or more arrangements, the vehicle sensor(s) 221 can include one or more accelerometers, one or more gyroscopes, an inertial measurement unit (IMU), a dead-reckoning system, a global positioning system (GPS) 222, a global navigation satellite system (GNSS), a navigation system 247, and/or other suitable sensors.

Alternatively, or in addition, the sensor system 220 can include one or more external environment sensors 223 configured to acquire, and/or sense driving environment data. "Driving environment data" includes and data or information about the external environment in which an autonomous vehicle is located or one or more portions thereof. For example, the one or more external environment sensors 223 can be configured to detect, quantify and/or sense objects in at least a portion of the external environment of the autonomous vehicle 100 and/or information/data about such objects. Such objects can be stationary objects and/or dynamic objects. Further, the one or more external environment sensors 223 can be configured to detect, measure, quantify and/or sense other things in the external environment of the autonomous vehicle 100, such as, for example, lane markers, signs, traffic lights, traffic signs, lane lines, crosswalks, curbs proximate the autonomous vehicle 100, off-road objects, etc. In one or more arrangements, the external environment sensors 223 can include, for example, one or more camera(s) 224, one or more RADAR sensor(s) 225, one or more LIDAR sensor(s) 226, etc.

Various examples of sensors of the sensor system 220 will be described herein. The example sensors can be part of the one or more external environment sensors 223 and/or the one or more vehicle sensor(s) 221. However, it will be understood that the examples are not limited to the particular sensors described. As an example, in one or more arrangements, the sensor system 220 can include one or more radar sensors 225, one or more LIDAR sensors 226, one or more sonar sensors, and/or one or more camera(s) 224. In one or more arrangements, the one or more camera(s) 224 can be high dynamic range (HDR) cameras or infrared (IR) cameras.

In some arrangements, the sensor(s) in the sensor system 220 can be positioned to detect one or more conditions on the autonomous vehicle 100 and/or the trailer 105 when it is attached thereto. For example, the sensor(s) in the sensor system 220 can detect the trailer 105 jackknifing. The sensor(s) may be back-up camera(s) 224 positioned to observe the trailer hitch ball 110. Additionally or alternatively, the sensor(s) in the sensor system 220 can detect the alignment of the trailer 105 and autonomous vehicle 100 with a launch ramp 120, for example. Additionally or alternatively, the sensor(s) in the sensor system 220 can detect whether the autonomous vehicle 100 is in water. The sensor(s) may be back-up camera(s) 224 positioned to observe the launch ramp 120 directly behind the autonomous vehicle 100.

The autonomous vehicle 100 can include an input system 265. An "input system" includes any device, component, system, element or arrangement or groups thereof that enable information/data to be entered into a machine. The input system 265 can receive an input from a vehicle passenger (e.g. a driver or a passenger). The autonomous vehicle 100 can include an output system 270. An "output system" includes any device, component, or arrangement or groups thereof that enable information/data to be presented to a vehicle passenger or occupant (e.g. a person, a vehicle passenger, etc.).

The autonomous vehicle 100 can include one or more vehicle systems 240. Various examples of the one or more vehicle systems 240 are shown in FIG. 2. However, the autonomous vehicle 100 can include more, fewer, or different vehicle systems. It should be appreciated that although particular vehicle systems are separately defined, each or any of the systems or portions thereof can be otherwise combined or segregated via hardware and/or software within the autonomous vehicle 100. The autonomous vehicle 100 can include a propulsion system 241, a braking system 242, a steering system 243, throttle system 244, a transmission system 245, a signaling system 246, a navigation system 247, and/or a communications system 248. Each of these systems can include one or more devices, components, and/or combination thereof, now known or later developed.

The navigation system 247 can include one or more devices, applications, and/or combinations thereof, now known or later developed, configured to determine the geographic location of the autonomous vehicle 100 and/or to determine a travel route for the autonomous vehicle 100. The navigation system 247 can include one or more mapping applications to determine a path for the autonomous vehicle 100. The navigation system 247 can include a global positioning system 222, a local positioning system or a geolocation system.

The autonomous vehicle 100 can include one or more modules 250, at least some of which are described herein. The modules can be implemented as computer-readable program code that, when executed by the one or more processor(s) 205, implement one or more of the various processes described herein. One or more of the modules 250 can be a component of the processor(s) 205, or one or more of the modules 250 can be executed on and/or distributed among other processing systems to which the processor(s) 205 is operatively connected. The modules 250 can include instructions (e.g., program logic) executable by one or more processor(s) 205. Alternatively, or in addition, the memory 210 can contain such instructions.

In one or more arrangements, one or more of the modules 250 described herein can include artificial or computational intelligence elements, e.g., neural network, fuzzy logic or other machine learning algorithms. Further, in one or more arrangements, one or more of the modules 250 can be distributed among a plurality of the modules described herein. In one or more arrangements, two or more of the modules 250 described herein can be combined into a single module.

The autonomous vehicle 100 can include an automated control module(s) 256. The automated control module(s) 256 can be configured to communicate with the various vehicle systems 240. In one or more arrangements, the processor(s) 205 and/or automated control module(s) 256 can be operatively connected to communicate with the various vehicle systems 240 and/or individual components thereof. For example, the processor(s) 205 and/or the automated control module(s) 256 can be in communication to send and/or receive information from the various vehicle systems 240 to control the movement, speed, maneuvering, heading, direction, etc. of the autonomous vehicle 100. The processor(s) 205 and/or the automated control module(s) 256 can control some or all of these vehicle systems 240 and, thus, the autonomous vehicle 100 can be partially or fully autonomous.

The autonomous vehicle 100 can include one or more actuators 275. The actuators 275 can be any element or combination of elements operable to modify, adjust and/or alter one or more of the vehicle systems 240 or components thereof responsive to receiving signals or other inputs from the processor(s) 205 and/or the automated control module(s) 256. Any suitable actuator can be used. For instance, the one or more actuators 275 can include motors, pneumatic actuators, hydraulic pistons, relays, solenoids, and/or piezoelectric actuators, just to name a few possibilities.

The processor(s) 205 and/or the automated control module(s) 256 can be operable to control the navigation and/or maneuvering of the autonomous vehicle 100 by controlling one or more of the vehicle systems 240 and/or components thereof. For instance, when operating in an autonomous or semi-autonomous mode, the processor(s) 205 and/or the automated control module(s) 256 can control the direction and/or speed of the autonomous vehicle 100. The processor(s) 205 and/or the automated control module(s) 256 can cause the autonomous vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The automated control module(s) 256 can be configured to determine path(s), current autonomous driving maneuvers for the autonomous vehicle 100, future autonomous driving maneuvers and/or modifications to current autonomous driving maneuvers based on data acquired by the sensor system 220, driving scene models, and/or data from any other suitable source.

The automated control module(s) 256 can be configured to determine one or more driving maneuvers to follow the determined path(s) for the autonomous vehicle 100. "Driving maneuver" means one or more actions that affect the movement of a vehicle. Examples of driving maneuvers include: accelerating, decelerating, braking, turning, moving in a lateral direction of the autonomous vehicle 100, changing travel lanes, merging into a travel lane, and/or reversing, just to name a few possibilities. The automated control module(s) 256 can be configured can be configured to implement the determined driving maneuvers. The automated control module(s) 256 can cause, directly or indirectly, such autonomous driving maneuvers to be implemented.

Detailed examples are disclosed herein. However, it is to be understood that the systems and methods disclosed herein are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-6C, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A watercraft transfer system for controlling an autonomous vehicle with a trailer attached thereto, the trailer being configured to support a watercraft, the system comprising:
   a processor;
   one or more contact sensors positioned on the trailer and operatively connected to the processor; and
   memory operatively connected to the processor and storing:
      a launch ramp detection module including instructions that, when executed by the processor, cause the processor to detect, in response to receiving a transfer signal, a launch location of a launch ramp for transferring the watercraft between land and water relative to a current location of the autonomous vehicle;
      an automated control module including instructions that, when executed by the processor, cause the processor to generate one or more control signals that control the autonomous vehicle to i) move to the launch location, and ii) move the trailer into the water using the launch ramp; and
      a floating determination module including instructions that, when executed by the processor, cause the processor to determine whether the watercraft on the trailer is floating in the water and to detect whether the watercraft is in contact with the trailer via the contact sensor.

2. The system of claim 1, wherein the launch ramp detection module further includes instructions to confirm the launch location by comparing the launch location with a map having data corresponding to a location of one or more launch ramps including the launch ramp that was detected.

3. The system of claim 2, wherein the automated control module further includes instructions to generate the one or more control signals in response to the launch location of the launch ramp being confirmed when the launch location matches the location of the one or more launch ramps from the map.

4. A watercraft transfer system for controlling an autonomous vehicle with a trailer attached thereto, the trailer being configured to support a watercraft, the system comprising:
   a processor;
   one or more pitch sensors positioned on the watercraft and any one of the trailer and the autonomous vehicle; and
   memory operatively connected to the processor and storing:
      a launch ramp detection module including instructions that, when executed by the processor, cause the processor to detect, in response to receiving a transfer signal, a launch location of a launch ramp for transferring the watercraft between land and water relative to a current location of the autonomous vehicle;
      an automated control module including instructions that, when executed by the processor, cause the processor to generate one or more control signals that control the autonomous vehicle to i) move to the launch location, and ii) move the trailer into the water using the launch ramp; and
      a floating determination module including instructions that, when executed by the processor, cause the processor to determine whether the watercraft on the trailer is floating in the water and to detect a pitch of the watercraft relative to a pitch of the trailer or a pitch of the autonomous vehicle.

5. The system of claim 4, wherein the launch ramp detection module further includes instructions to confirm the launch location by comparing the launch location with a map having data corresponding to a location of one or more launch ramps including the launch ramp that was detected.

6. The system of claim 5, wherein the automated control module further includes instructions to generate the one or more control signals in response to the launch location of the launch ramp being confirmed when the launch location matches the location of the one or more launch ramps from the map.

7. A method of transferring a watercraft between water and land with a trailer attached to an autonomous vehicle, the method comprising:
in response to receiving a transfer signal requesting a transfer of the watercraft between the trailer and water, detecting a launch location of a launch ramp relative to a current location of the autonomous vehicle;
generating one or more control signals to control the autonomous vehicle to i) move to the launch location and ii) to move the trailer into the water using the launch ramp; and
determining whether the watercraft is floating in the water based, at least in part, on a comparison of a pitch of the watercraft with a pitch of the trailer as detected by one or more pitch sensors positioned on the watercraft and the trailer.

8. The method of claim 7, further comprising:
determining whether the autonomous vehicle is in the water; and
responsive to the autonomous vehicle not being in the water, continuing to generate the one or more control signals to control the autonomous vehicle to move the trailer into the water using the launch ramp.

9. The method of claim 8, further comprising:
responsive to the autonomous vehicle being in the water, generating a control signal to stop the autonomous vehicle from further moving the trailer into the water along the launch ramp.

10. The method of claim 7, further comprising:
responsive to detecting that the watercraft floating in the water, transmitting a successful launch signal to a remote device indicating the watercraft has been launched.

11. The method of claim 7, further comprising:
confirming the launch location by comparing the launch location with a map that identifies coordinates of one or more launch ramps including the launch ramp, wherein generating the one or more control signals includes generating the one or more control signals responsive to confirming the launch location.

12. The method of claim 7, further comprising:
storing the launch location for repositioning the trailer at the launch location in response to receiving a haul out signal.

13. A method of transferring a watercraft between water and land with a trailer attached to an autonomous vehicle, the method comprising:
in response to receiving a transfer signal requesting a transfer of the watercraft between the trailer and water, detecting a launch location of a launch ramp relative to a current location of the autonomous vehicle;
generating one or more control signals to control the autonomous vehicle to i) move to the launch location and ii) to move the trailer into the water using the launch ramp; and
determining whether the watercraft is floating in the water based, at least in part, by determining whether the watercraft is in contact with the trailer as detected by one or more contact sensors positioned on a support surface of the trailer.

14. The method of claim 13, further comprising:
determining whether the autonomous vehicle is in the water; and
responsive to the autonomous vehicle not being in the water, continuing to generate the one or more control signals to control the autonomous vehicle to move the trailer into the water using the launch ramp.

15. The method of claim 14, further comprising:
responsive to the autonomous vehicle being in the water, generating a control signal to stop the autonomous vehicle from further moving the trailer into the water along the launch ramp.

16. The method of claim 13, further comprising:
responsive to detecting that the watercraft floating in the water, transmitting a successful launch signal to a remote device indicating the watercraft has been launched.

17. The method of claim 13, further comprising:
confirming the launch location by comparing the launch location with a map that identifies coordinates of one or more launch ramps including the launch ramp, wherein generating the one or more control signals includes generating the one or more control signals responsive to confirming the launch location.

18. The method of claim 13, further comprising:
storing the launch location for repositioning the trailer at the launch location in response to receiving a haul out signal.

* * * * *